(12) United States Patent
Werner (10) Patent No.: US 11,945,088 B2
(45) Date of Patent: Apr. 2, 2024

(54) HAND-HELD POWER TOOL HAVING A LOCKING DEVICE

(71) Applicant: Robert Bosch GmbH, Stuttgart (DE)

(72) Inventor: Immanuel Werner, Bad Urach (DE)

(73) Assignee: Robert Bosch GmbH, Stuttgart (DE)

( * ) Notice: Subject to any disclaimer, the term of this patent is extended or adjusted under 35 U.S.C. 154(b) by 149 days.

(21) Appl. No.: 17/494,254

(22) Filed: Oct. 5, 2021

(65) Prior Publication Data

US 2022/0118594 A1 Apr. 21, 2022

(30) Foreign Application Priority Data

Oct. 19, 2020 (DE) ..................... 10 2020 213 165.1

(51) Int. Cl.
 *B25D 17/08* (2006.01)
(52) U.S. Cl.
 CPC ...... *B25D 17/08* (2013.01); *B25D 2217/0042* (2013.01); *B25D 2250/231* (2013.01); *Y10T 279/17076* (2015.01)
(58) Field of Classification Search
 CPC ............ B25D 17/08; B25D 2217/0042; B25D 2250/231; Y10T 279/17076
 See application file for complete search history.

(56) References Cited

U.S. PATENT DOCUMENTS

| | | | | |
|---|---|---|---|---|
| 3,171,501 A | * | 3/1965 | Lear | E21B 6/06 173/96 |
| 4,131,165 A | * | 12/1978 | Wanner | B23Q 3/12 173/133 |
| 4,284,148 A | * | 8/1981 | Wanner | B25D 16/00 173/109 |
| 4,502,824 A | * | 3/1985 | Dohse | B23Q 3/12 173/13 |
| 5,199,833 A | * | 4/1993 | Fehrle | B25D 17/088 408/239 R |
| 5,340,245 A | * | 8/1994 | Bloechle | B23B 31/005 279/19.3 |
| 5,984,596 A | * | 11/1999 | Fehrle | B25D 17/088 175/395 |
| 6,073,705 A | * | 6/2000 | Shibata | B25D 17/088 279/19.5 |

(Continued)

FOREIGN PATENT DOCUMENTS

| | | | |
|---|---|---|---|
| DE | 3526162 A1 | * | 1/1987 |
| DE | 3536132 A1 | * | 4/1987 |

(Continued)

*Primary Examiner* — Eric A. Gates
(74) *Attorney, Agent, or Firm* — Maginot, Moore & Beck LLP (57) ABSTRACT

A hand-held power tool includes a tool receptacle with which a tubular tool holder configured to receive an application tool is associated, and a locking device configured to lock the application tool in the tubular tool holder. The locking device locks the application tool in a locking position via at least one locking element in the tubular tool holder. The locking device has a locking sleeve and a pressure ring spring loaded via an associated spring element. The spring-loaded pressure ring is configured to force the locking sleeve into the locking position and, in the locking position, forces the at least one locking element against the tool holder.

11 Claims, 8 Drawing Sheets

(56) References Cited

U.S. PATENT DOCUMENTS

| | | | | |
|---|---|---|---|---|
| 6,092,814 A * | 7/2000 | Kageler | ............... | B25D 17/088 279/22 |
| 6,464,234 B2 * | 10/2002 | Frauhammer | ........ | B25D 17/088 279/75 |
| 6,536,780 B2 * | 3/2003 | Baumann | ............ | B25D 17/088 279/22 |
| 7,360,606 B2 * | 4/2008 | Saur | .................... | B25D 17/088 173/132 |
| 7,644,929 B2 * | 1/2010 | Frauhammer | ............ | B23Q 3/12 279/22 |
| 8,210,545 B2 * | 7/2012 | Hild | ................... | B23B 31/1071 279/19.6 |
| 8,459,658 B2 * | 6/2013 | Cycon | ................. | B25D 17/088 173/132 |
| 2003/0089509 A1 * | 5/2003 | Wanek | ................. | B25D 17/088 173/48 |
| 2005/0232715 A1 * | 10/2005 | Baumann | ............ | B25D 17/088 408/226 |
| 2006/0192350 A1 * | 8/2006 | Kleine | ................ | B25D 17/088 279/19.3 |
| 2007/0024013 A1 * | 2/2007 | Hauptmann | ........... | B25D 17/24 279/75 |
| 2009/0160138 A1 * | 6/2009 | Bohne | ................. | B23B 31/1071 279/30 |
| 2015/0197002 A1 * | 7/2015 | Didier | ................. | B25D 17/088 173/109 |

FOREIGN PATENT DOCUMENTS

| | | | | |
|---|---|---|---|---|
| DE | 10030962 A1 * | 1/2002 | ......... | B23Q 11/0046 |
| DE | 101 42 729 A1 | 3/2003 | | |
| DE | 102004016014 A1 * | 10/2005 | ......... | B23B 31/1071 |
| DE | 10 2006 036 955 A1 | 2/2008 | | |
| DE | 102006057934 A1 * | 6/2008 | ............. | B23B 31/11 |
| EP | 1946894 A1 * | 7/2008 | ............... | B23Q 3/12 |
| GB | 2297513 A * | 8/1996 | ............... | B23Q 3/12 |
| GB | 2313566 A * | 12/1997 | ............... | B23Q 3/12 |
| GB | 2314795 A * | 1/1998 | ............... | B25D 17/088 |
| GB | 2326123 A * | 12/1998 | ............... | B25D 17/088 |
| GB | 2333980 A * | 8/1999 | ............... | B25D 17/088 |
| WO | WO-0034013 A1 * | 6/2000 | ............... | B23Q 3/12 |
| WO | WO-0153045 A1 * | 7/2001 | ........... | B25D 17/088 |
| WO | WO-2008062851 A1 * | 5/2008 | ........... | B25D 17/088 |
| WO | 2019/042792 A1 | 3/2019 | | |

* cited by examiner

HAND-HELD POWER TOOL HAVING A LOCKING DEVICE

This application claims priority under 35 U.S.C. § 119 to application no. DE 10 2020 213 165.1, filed on Oct. 19, 2020 in Germany, the disclosure of which is incorporated herein by reference in its entirety.

TECHNICAL FIELD

The disclosure relates to a hand-held power tool having a tool receptacle with which a tubular tool holder is associated, in which an application tool is able to be locked via an associated locking device, wherein the locking device locks the application tool in a locking position via at least one locking element in the tool holder.

BACKGROUND

Such a hand-held power tool having a locking device is known from the prior art. The locking device serves to lock an application tool arranged in an associated tool receptacle. In this case, the application tool is locked in the tool receptacle via locking elements. The locking device has a sleeve and the locking elements are continuously in contact with the sleeve during operation of the hand-held power tool and when locking and unlocking the application tool.

SUMMARY

The disclosure relates to a hand-held power tool having a tool receptacle with which a tubular tool holder is associated, in which an application tool is able to be locked via an associated locking device, wherein the locking device locks the application tool in a locking position via at least one locking element in the tool holder. The locking device has a locking sleeve and a pressure ring spring loaded via an associated spring element, wherein the spring-loaded pressure ring forces the locking sleeve into the locking position and, in the locking position, forces the at least one locking element against the tool holder.

The disclosure thus allows the provision of a hand-held power tool in which, as a result of the at least one locking element being forced against the tool holder, a locking device with reduced wear can be provided. Thus, a lifetime of the locking device can be increased.

Preferably, a stop sleeve is provided, which has a contact surface on its inner circumference, wherein, in the locking position, the at least one locking element is forced against the contact surface by the pressure ring.

Thus, improved wear resistance when the at least one locking element moves can be allowed in a simple manner.

The locking sleeve preferably has, at an axial end, a radially outer sleeve and a radially inner sleeve, which are arranged coaxially with one another, wherein the outer and inner sleeve are formed in one piece with the locking sleeve, and wherein a receptacle in which the stop sleeve engages is formed between the outer and inner sleeve.

Thus, a compact locking sleeve can be provided.

According to one embodiment, the tool holder and the locking sleeve, in particular the inner sleeve, at least each have an associated cutout in which the at least one locking element is arranged.

Thus, a secure and reliable arrangement of the at least one locking element can be allowed.

Preferably, the associated cutout of the locking sleeve, in particular of the inner sleeve, is at least approximately U-shaped with an open end, wherein the open end is arranged facing the spring-loaded pressure ring.

Thus, an arrangement of the at least one locking element in the cutout can be allowed in a simple manner.

The locking sleeve, in particular the outer sleeve, preferably has, on its inner circumference, at least one radially inwardly directed extension and the stop sleeve has, on its outer circumference, at least one receptacle associated with the extension, so as to form a rotation lock for the locking sleeve.

Thus, a rotation lock can be provided in an easy and uncomplicated manner, with which rotation of the locking sleeve can be prevented, with the result that the locking elements can rotate freely and lateral forces on the locking elements, which might cause wear, can be prevented.

According to one embodiment, the locking sleeve forms an inner receptacle in which the spring-loaded pressure ring is arranged.

Thus, a secure and reliable arrangement of the pressure ring can be allowed.

The spring-loaded pressure ring preferably has, on its end face facing the at least one locking element, at least one receptacle for forming linear or surface contact with the at least one locking element in the locking position.

Thus, wear of the at least one locking element and/or of the locking device can be reduced in a simple manner.

Preferably, the locking sleeve exhibits a first material, in particular plastic, and the spring-loaded pressure ring exhibits a second material, in particular a metal material.

Thus, a suitable material for reducing wear can be provided in each case in an easy and uncomplicated manner.

Preferably, the hand-held power tool is configured in the manner of a hammer drill or chipping hammer, wherein the tubular tool holder is a hammer tube.

Thus, a suitable hand-held power tool can be provided in an easy and uncomplicated manner.

BRIEF DESCRIPTION OF THE DRAWINGS

The disclosure is explained in more detail in the following description on the basis of exemplary embodiments illustrated in the drawings, in which.

DETAILED DESCRIPTION

In the figures, elements with the same or a comparable function are provided with identical reference signs and described in detail only once.

Figure 1:
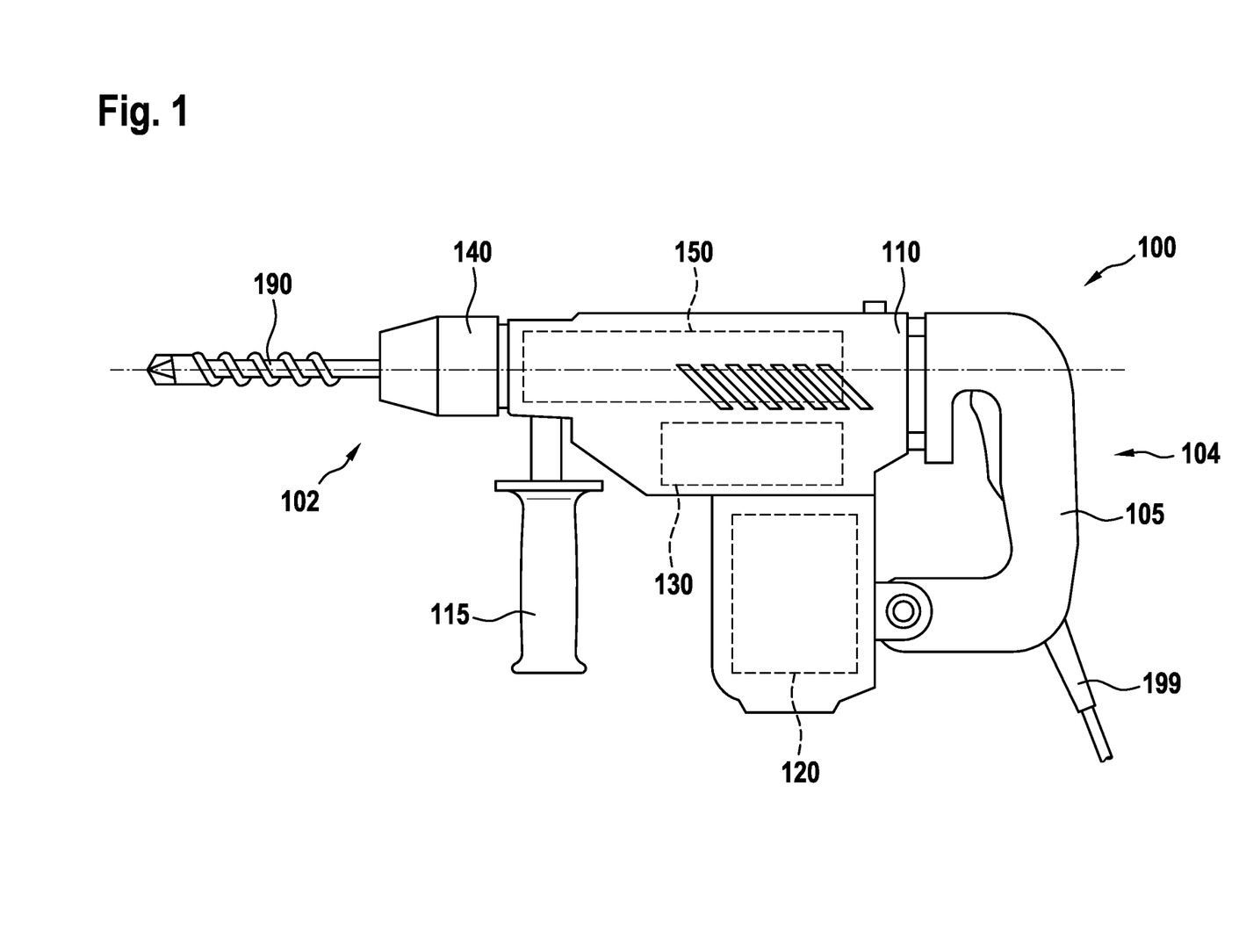
FIG. 1 shows a side view of a hand-held power tool according to the disclosure with a tool receptacle according to the disclosure.

FIG. 1 shows an example of a hand-held power tool 100 having a housing 110 in which a drive unit 120 for driving a tool receptacle 140 is arranged. The tool receptacle 140 is preferably configured to receive an application tool 190 and preferably a 22 mm HEX tool receptacle, but can also be configured as an SDSmax or SDSplus tool receptacle. Optionally, an output unit 130, in particular a transmission, is associated with the drive unit 120, but the hand-held power tool 100 can also be configured without the output unit 130. Furthermore, the hand-held power tool 100 preferably has an impact mechanism 150 for generating an impact pulse. An impact pulse of the impact mechanism 150 is able to be generated in a manner already known to a person skilled in the art. In particular a suitable impact mechanism with which the impact mechanism 150 can be realized is sufficiently well known to a person skilled in the art, and so a detailed description of the impact mechanism 150 will not be given here so as to make the description simple and concise.

As illustrated, the housing 110 has a handle 105 on its side 104 facing away from the tool receptacle 140 and an optional auxiliary handle 115 on its side 102 facing the tool receptacle 140. As illustrated, the hand-held power tool 100 is able to be connected to a power supply via a power cable 199, but the hand-held power tool 100 can also be operated in a cable-free manner, for example via a battery pack. Preferably, the hand-held power tool 100 is configured in the form of a hammer drill or chipping hammer. Such a hand-held power tool 100 is sufficiently well known from the prior art and so a detailed description thereof will not be given here so as to make the description concise.

Figure 2:
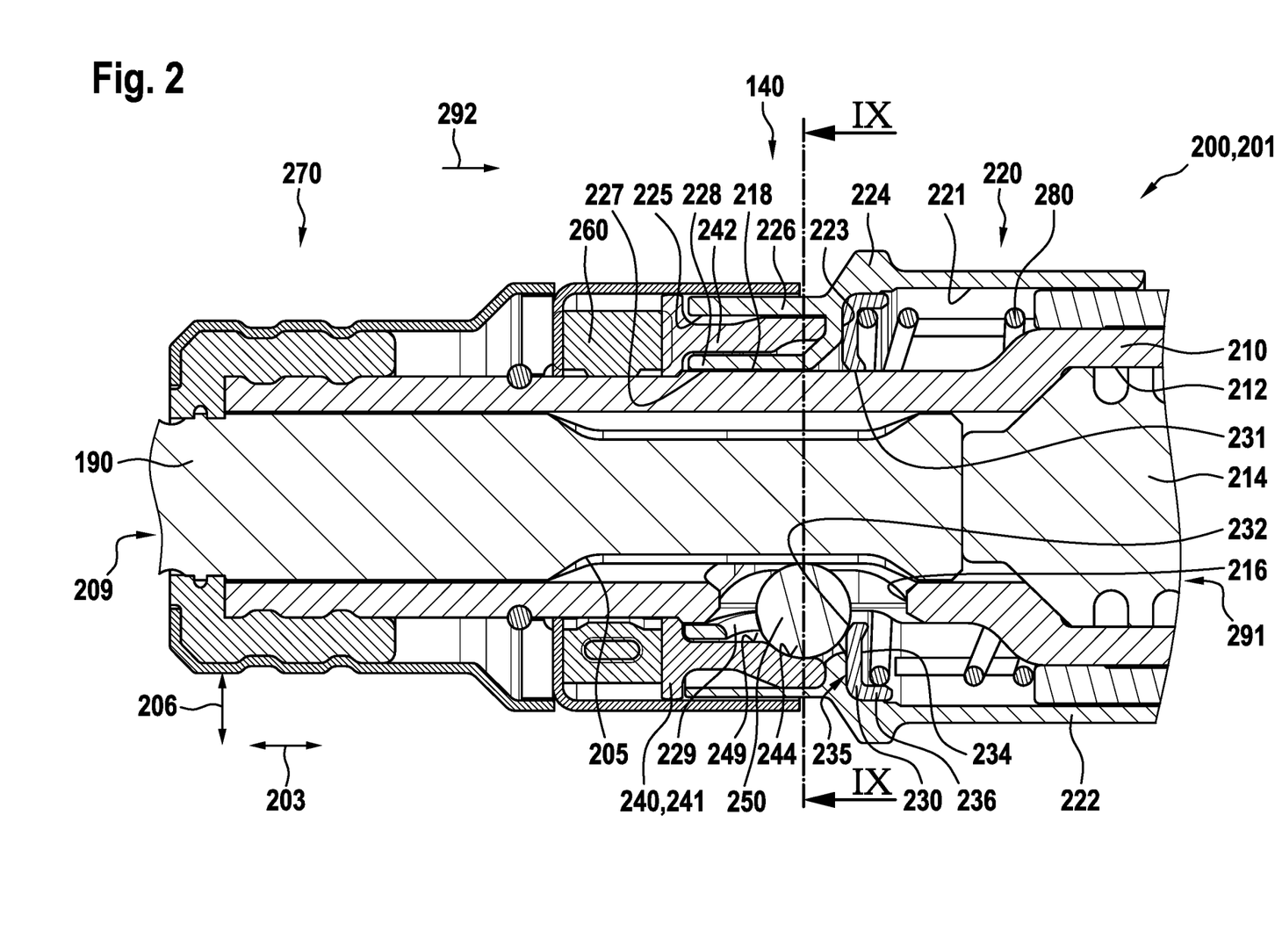
FIG. 2 shows a longitudinal section through the tool receptacle from FIG. 1 in a locking position.

FIG. 2 illustrates the tool receptacle 140 from FIG. 1 with a locking device 200 in a locking position 201 in which the example of an application tool 190 from FIG. 1 is locked in the tool receptacle 140. The locking device 200 has an elongate extent 203, which defines an axial direction, and a radial direction 206. The tool receptacle 140 preferably has a tubular tool holder 210 for receiving the application tool 190. Preferably, the tubular tool holder 210 has a hammer tube and is particularly preferably formed in one piece therewith.

The tool holder 210 preferably has an inner receptacle 212. A striker 214 associated for example with the impact mechanism 150 from FIG. 1 is arranged in a portion of the inner receptacle 212 illustrated on the right, and the application tool 190 is arranged, as illustrated, in a portion of the inner receptacle 212 illustrated on the left. The application tool 190 has in this case a fixing portion 205 which faces the striker 214 and via which the application tool 190 is fixed in the tool holder 210 by the locking device 200. Furthermore, the tool holder 210 preferably has at least one cutout 216.

Preferably, at least one locking element 250 is associated with the locking device 200, said locking element 250 being able to be arranged in the at least one cutout 216 in order to lock the application tool 190. Preferably, two or three locking elements 250 are provided, but it is also possible for more than three locking elements 250 to be present. As illustrated, the at least one locking element 250 is in the form of a ball. However, the at least one locking element 250 can also be configured in some other desired way, for example as a roller, or have any desired form with a spherical portion.

Preferably, the application tool 190 is able to be locked in the tool holder 210 via the locking device 200. The locking device 200 in this case locks the application tool 190 in the locking position 201 preferably via at least one locking element 250 in the tool holder 210.

Preferably, the locking device 200 has a locking sleeve 220 and a pressure ring 230 that is spring loaded via an associated spring element 280. The spring-loaded pressure ring 230 preferably forces the locking sleeve 220 into the locking position 201. In the locking position 201, the at least one locking element 250 is preferably forced against the tool holder 210, preferably at least regionally.

Preferably, the locking sleeve 220 has a first axial end 291 facing the striker 214, and an opposite second axial end 292. At the second axial end 292, the locking sleeve 220 preferably has a radially outer sleeve 226 and a radially inner sleeve 228, which are arranged coaxially with one another. The outer and inner sleeves 226, 228 are preferably formed in one piece. Preferably formed between the outer and inner sleeves 226, 228 is a receptacle 225 in which a stop sleeve 240 engages.

Preferably, the locking sleeve 220 has a portion 222, illustrated on the right, with an inner receptacle 221, wherein the spring-loaded pressure ring 230 is arranged in the inner receptacle 221. The portion 222 is preferably arranged in the region of the striker 214 and connected to the outer and inner sleeves 226, 228 via an actuating portion 224, wherein the outer and inner sleeves 226, 228 are arranged in the region of the application tool 190. Preferably, the locking sleeve 220, in particular inner sleeve 228, forms a positioning portion 227 for positioning on an outer circumference 218 of the tool receptacle 210 in the region of the cutout 216. In this case, an abutment edge 223 for delimiting along the longitudinal extent 203 or in the axial direction of the pressure ring 230 is preferably formed in the region of the actuating portion 224.

The tool holder 210 and the locking sleeve 220, in particular the inner sleeve 228, preferably at least each have an associated cutout 216, 229. The at least one locking element 250 is preferably arranged in the at least one associated cutout 216, 229. According to one embodiment, the associated cutout 229 of the locking sleeve 220, in particular of the inner sleeve 228, is formed at least approximately in a U-shaped manner with an open end (620 in FIG. 6). Preferably, the open end (620 in FIG. 6) is arranged facing the spring-loaded pressure ring 230.

The spring-loaded pressure ring 230 is preferably formed in an annular manner with an inner receptacle 231 and preferably with an encircling outer collar 236. Preferably, the outer collar 236 forms an outer circumference of the pressure ring 230. On its side facing the striker 214, the pressure ring 230 has, as illustrated, an abutment face 234, via which the spring element 280 forces the pressure ring 230 against the outer and inner sleeves 226, 228.

At its end face 235 facing the at least one locking element 250, the pressure ring 230 preferably bears against the abutment edge 223 of the actuating portion 224, or is forced against the abutment edge 223 by the spring element 280. Furthermore, the pressure ring 230 preferably has, in particular on its inner receptacle 231, at least one receptacle 232 for forming linear or surface contact with the at least one locking element 250 in the locking position 201. The receptacle 232 is in this case preferably arranged facing the locking element 250.

Furthermore, the locking sleeve 220 preferably exhibits a first material and the spring-loaded pressure ring 230 exhibits a second material. The first material is preferably plastic, in particular a dimensionally stable plastic, for example hard plastic. Furthermore, the plastic can be configured as a reinforced plastic, in particular a fiber-reinforced and/or carbon fiber-reinforced plastic, for example polyamide with glass fibers. The second material is preferably a metal material, preferably steel. In particular, the second material is preferably a hardenable material, for example metal, sintered material.

Furthermore, a stop sleeve 240 is provided. The stop sleeve 240 preferably has a disk-like collar 241 arranged facing away from the striker 214, and a sleeve portion 242 arranged facing the striker 214. At its inner circumference 249, the stop sleeve 240, in particular the sleeve portion 242, preferably has a contact surface 244. The sleeve portion 242 is arranged, in the locking position 201, in the receptacle 225 of the locking sleeve 220. In the locking position 201, the at least one locking element 250 is preferably forced against the contact surface 244 by the pressure ring 230. The contact surface 244 is preferably configured in the form of a circle segment. During locking and/or unlocking, the sleeve portion 242 is preferably arranged only partially in the receptacle 225.

A protective cap 270 is preferably arranged at a free end 209 of the tool holder 210. Furthermore, a damping element 260 is preferably arranged between the protective cap 270 and the second axial end 292 of the locking device 200.

In the locking position 201 shown in FIG. 2, the locking element 250 is arranged in the cutouts 216, 229. In this case, the pressure ring 230 forces the locking element 250 against the tool holder 210. The application tool 190 arranged in the tool holder 210 is in the process fixed or locked in the fixing portion 205 by the locking element 250.

Figure 3:
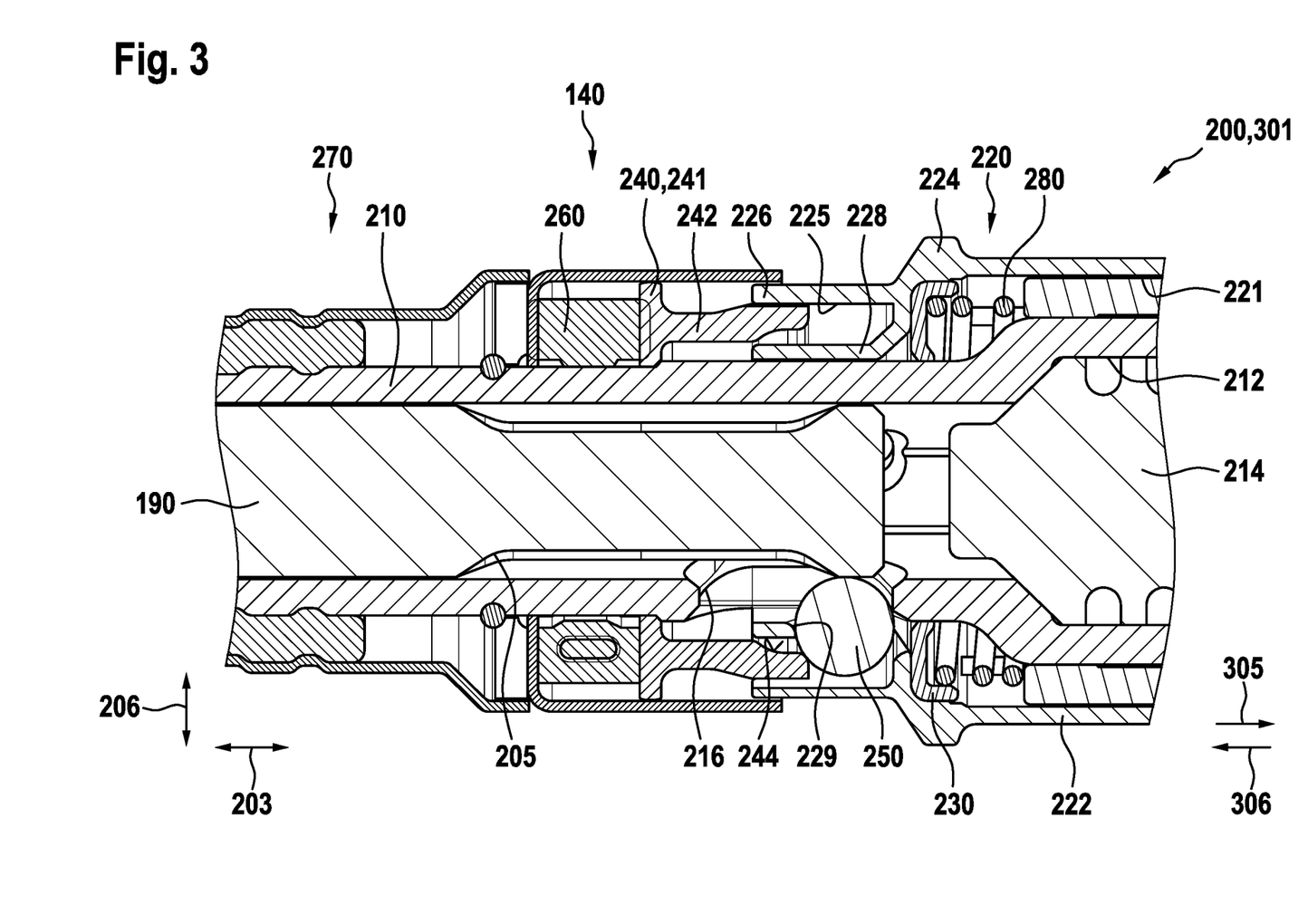
FIG. 3 shows a longitudinal section through the tool receptacle from FIG. 1 and FIG. 2 in an unlocking position.

FIG. 3 shows the tool receptacle 140 from FIG. 1 and FIG. 2 with the locking device 200 from FIG. 2 in an unlocking position 301 in which the application tool 190 in the tool receptacle 140 is unlocked. It should be noted that, in the unlocking position 301, the application tool 190 is not fixed in the tool receptacle 140 but is pushed into or removed from the latter. Preferably, there is no operation of the hand-held power tool 100 in the unlocking position 301.

In the unlocking position 301, the locking sleeve 220 is preferably arranged in a position pushed, as illustrated, to the right in the direction of an arrow 305 by being forced against the actuating portion 224 by a user of the hand-held power tool 100. In this case, the spring element 280 is compressed and the locking element 250 is released. In an example of removal of the application tool 190 from the tool holder 210, or moving of the application tool 190 in the direction of an arrow 306, i.e., as illustrated, to the left, the locking element 250 moves out of the cutout 216 of the tool holder 210 in a radial direction 206.

According to one embodiment, the locking element 250 is in direct contact with the locking sleeve 220 only in the unlocking position 301. Since this direct contact takes place when the locking sleeve 220 is shifted manually by a user of the hand-held power tool 100, unnecessary wear or damage to the locking sleeve 220 can be prevented.

Figure 4:
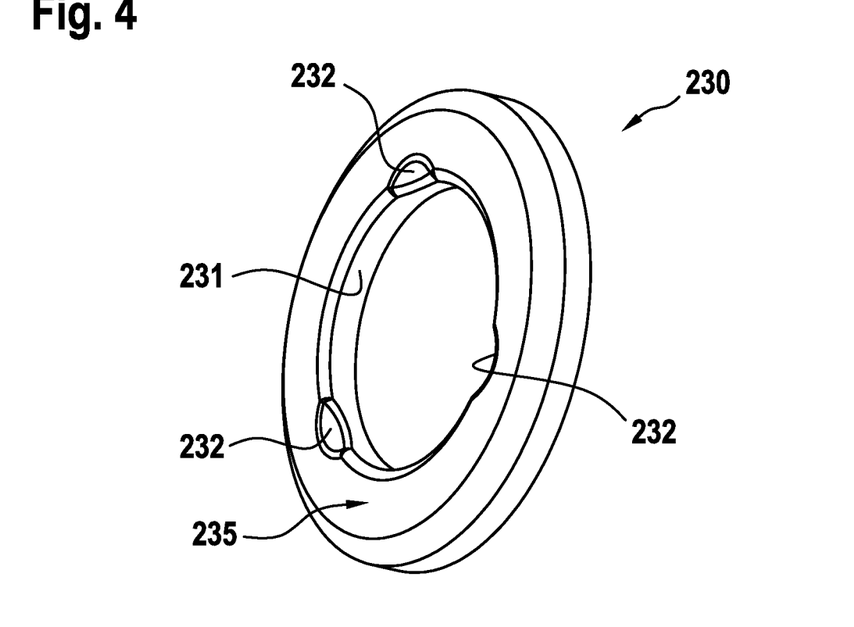
FIG. 4 shows a perspective view of a pressure ring associated with the tool receptacle from FIG. 1 to FIG. 3.

FIG. 4 shows the pressure ring 230 of the locking device 200 from FIG. 2 and FIG. 3. As illustrated, the pressure ring 230 has, on its end face 235 facing the locking elements 250, three receptacles 232 for forming linear or surface contact with the at least one locking element 250 in the locking position 201 of FIG. 2. The receptacles 232 shown in FIG. 4 are preferably configured to form surface contact with the locking elements 250. The receptacles 232 are, as described above, associated with the inner receptacle 231. Preferably, the receptacles 232 are arranged uniformly in the circumferential direction. However, the receptacles 232 can also be arranged non-uniformly in the circumferential direction.

Figure 5:
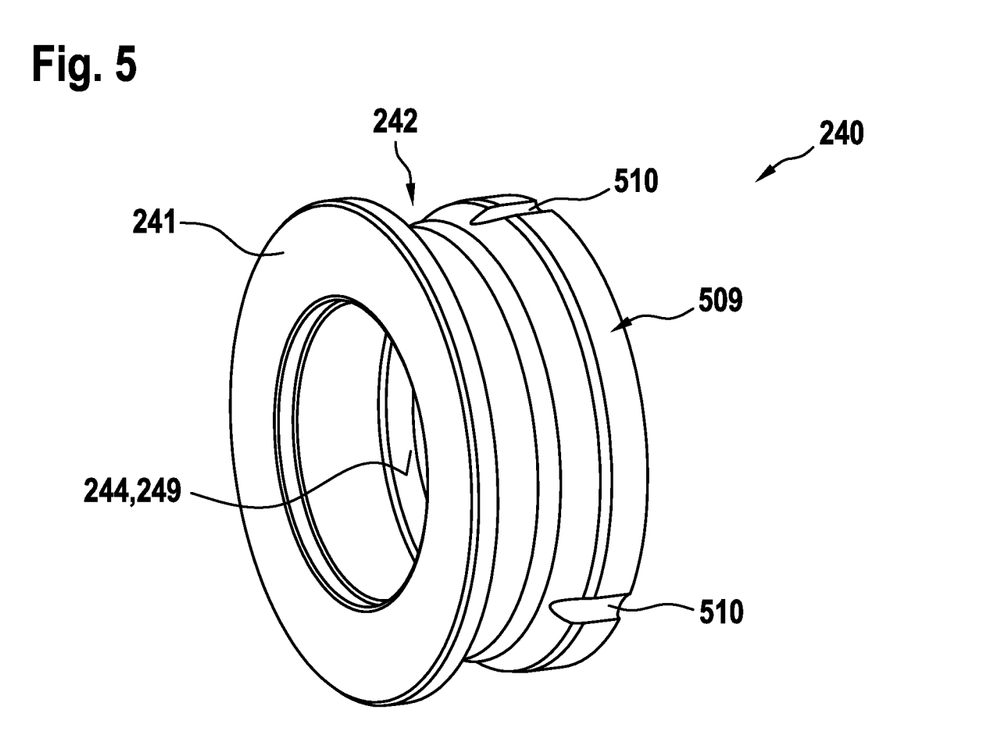
FIG. 5 shows a perspective view of a stop sleeve associated with the tool receptacle from FIG. 1 to FIG. 3.

FIG. 5 shows the stop sleeve 240 of the locking device 200 from FIG. 2 and FIG. 3. In this case, FIG. 5 illustrates the disk-like collar 241 and the sleeve portion 242 with the contact surface 244 arranged on the inner circumference 249. Furthermore, the stop sleeve 240 has, on its outer circumference 509, at least one receptacle 510 associated with the extension (610 in FIG. 6), so as to form a rotation lock for the locking sleeve 220. As illustrated, two receptacles 510 are shown in FIG. 5.

Figure 6:
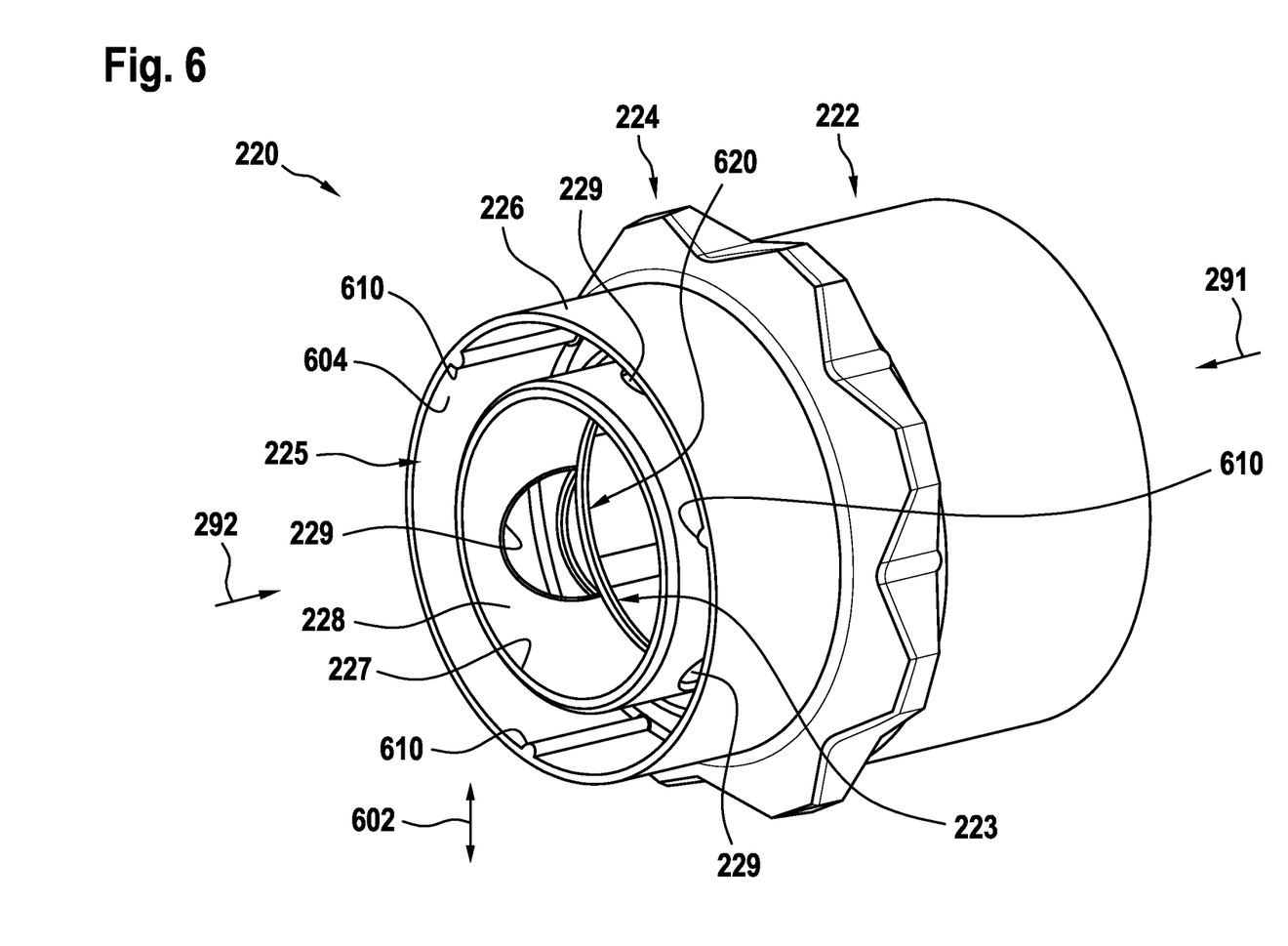
FIG. 6 shows a perspective view of a locking sleeve associated with the tool receptacle from FIG. 1 to FIG. 3, as seen from a first side.

FIG. 6 shows the locking sleeve 220 of the locking device 200 from FIG. 2 and FIG. 3 with its first and second axial ends 291, 292. Preferably, the sleeves 226, 228, arranged coaxially with one another, of the locking sleeve 220 are formed in one piece.

Furthermore, the locking sleeve 220, in particular the outer sleeve 226, preferably has on its inner circumference 604 at least one extension 610 directed radially inwardly or in a radial direction 602 of the locking sleeve 220. As illustrated, three extensions 610 are arranged on the outer sleeve 226. The extensions 610 are preferably able to be arranged in the receptacles 510 of the stop sleeve 240 from FIG. 5 and preferably form, with the receptacles 510 from FIG. 5, a rotation lock for the locking sleeve 220. The extensions 610 preferably have a semicircular cross section.

Preferably, the associated cutout 229 of the locking sleeve 220, in particular of the inner sleeve 228, is configured in an at least approximately U-shaped manner with an open end 620. The open end 620 is in this case preferably arranged facing the first axial end 291 of the locking sleeve 220. In particular, the open end 620 is arranged facing the spring-loaded pressure ring 230 from FIG. 2, FIG. 3 and FIG. 4.

Furthermore, FIG. 6 illustrates the actuating portion 224, which has a larger outside diameter than the outer sleeve 226 and the portion 222. Via the actuating portion 224, the locking sleeve 220 is preferably forced or shifted into the unlocking position 301 from FIG. 3 by a user.

Figure 7:
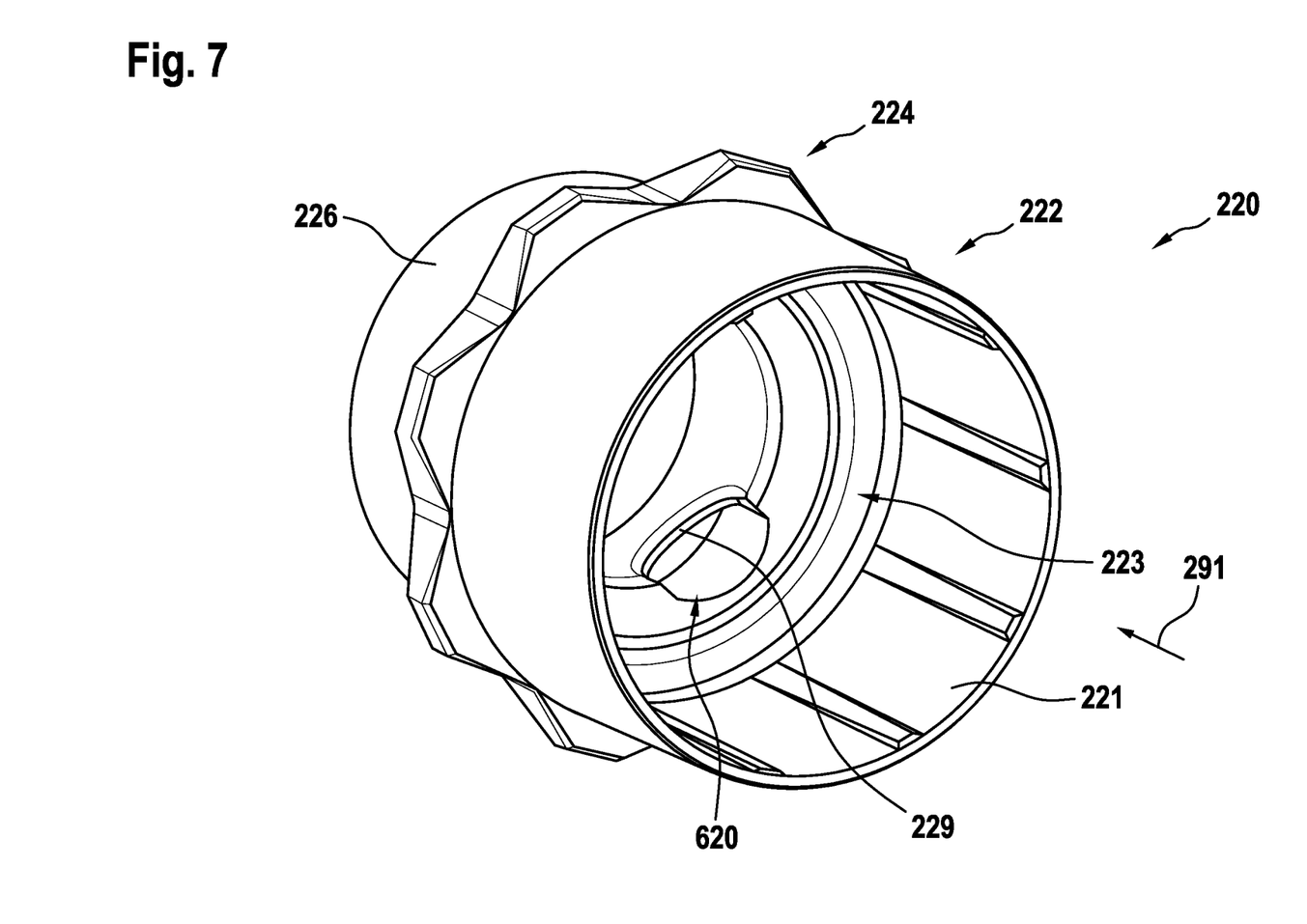
FIG. 7 shows a perspective view of the locking sleeve from FIG. 6, as seen from a second side.

FIG. 7 shows the locking sleeve 220 from FIG. 6 as seen from its first axial end 291 and illustrates the cutout 229 configured at least approximately in a U-shaped manner with the open end 620. Furthermore, FIG. 7 illustrates the abutment edge 223 of the portion 222, against which the pressure ring 230 from FIG. 4 bears with its end face 235.

Figure 8:
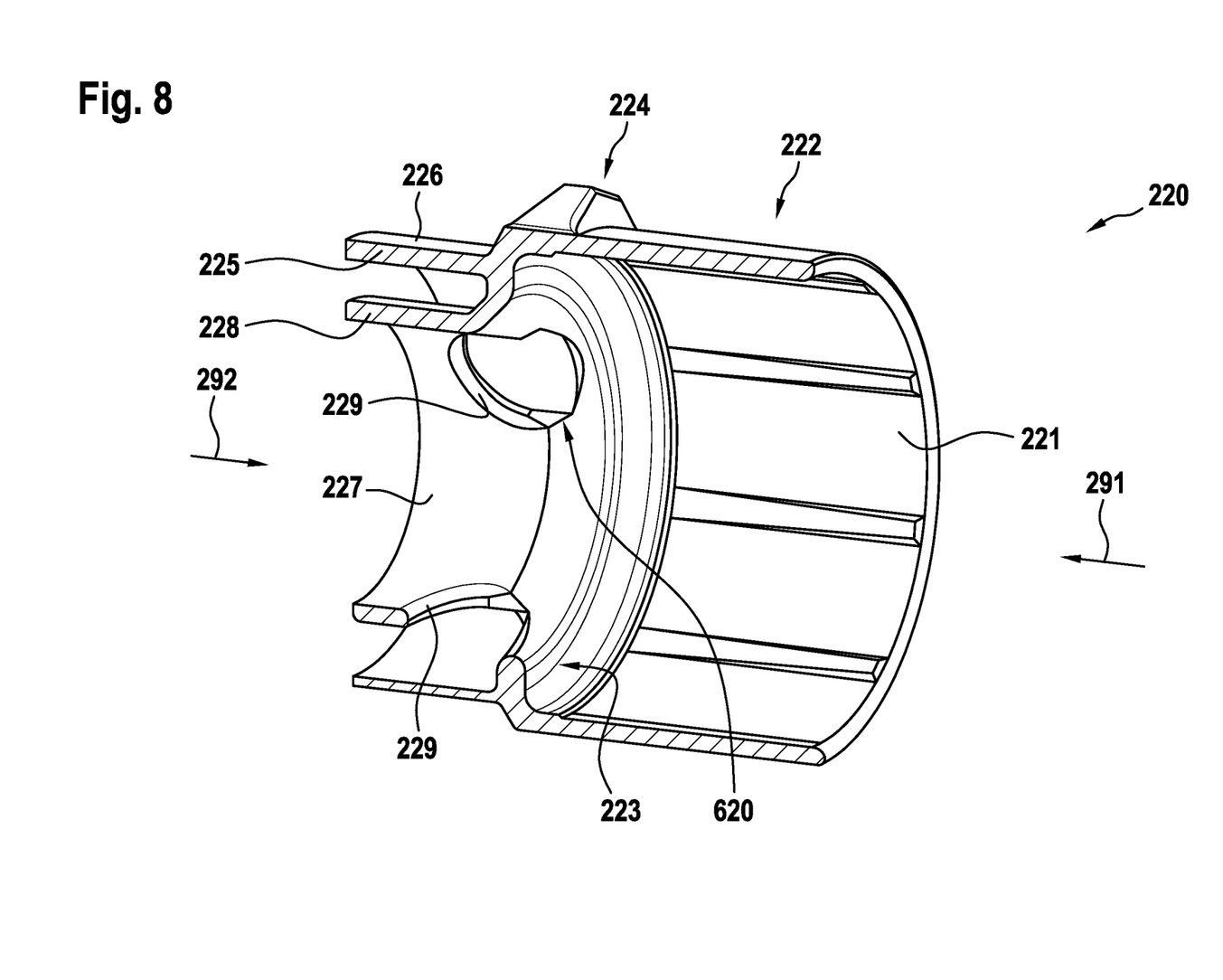
FIG. 8 shows a longitudinal section through the locking sleeve from FIG. 6 and FIG. 7.

FIG. 8 shows the locking sleeve 220 from FIG. 6 and FIG. 7 and illustrates the arrangement of the cutouts 229 on the inner sleeve 228. Furthermore, FIG. 8 shows the concentric arrangement of the outer and inner sleeves 226, 228 with respect to one another, wherein the two sleeves 226, 228 are connected together via the abutment edge 223 in the region of the actuating portion 224.

Figure 9:
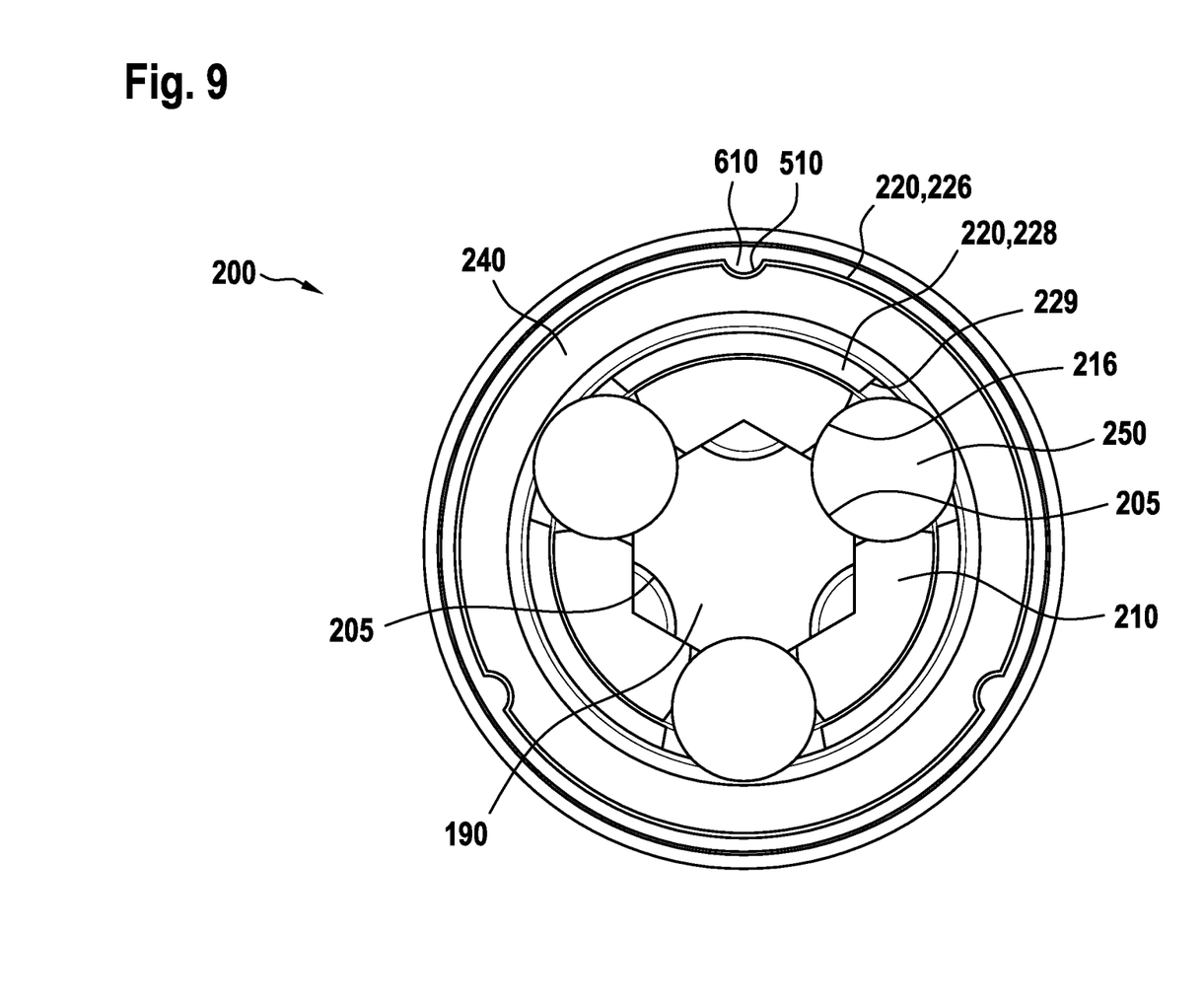
FIG. 9 shows a sectional view of the tool receptacle in the locking position from FIG. 2, as seen in the direction of arrows IX in FIG. 2.

FIG. 9 shows the locking device 200 from FIG. 1 to FIG. 3 and illustrates the arrangement of the extensions 610 in the receptacles 510 of the stop sleeve 240 so as to form a rotation lock for the locking sleeve 220. Furthermore, FIG. 9 illustrates the forcing of the, as illustrated, three locking elements 250 against the tool holder 210. In this case, the locking elements 250 preferably fix the application tool 190 in its fixing portion 205.

What is claimed is:
1. A hand-held power tool, comprising:
   a tool receptacle comprising:
      a tubular tool holder configured to receive an application tool; and
      a locking device configured to lock the application tool in the tubular tool holder, the locking device comprising:
         at least one locking element arranged in the tubular tool holder and configured to lock the application tool in a locking position;
         a locking sleeve;
         a spring element;

a pressure ring that is spring loaded via the spring element so as to force the locking sleeve into the locking position and, in the locking position, force the at least one locking element against the tubular tool holder; and a stop sleeve having a contact surface on an inner circumference of the stop sleeve, the contact surface having an angled portion that is angled relative to an axial direction of the locking device, wherein, in the locking position the at least one locking element is forced against the angled portion of the contact surface by the pressure ring.

2. The hand-held power tool according to claim 1, wherein:

the locking sleeve has, at an axial end, a radially outer sleeve and a radially inner sleeve which are arranged coaxially with one another;

the outer and inner sleeves are formed in one piece with the locking sleeve; and a receptacle in which the stop sleeve engages is formed between the outer and inner sleeves.

3. The hand-held power tool according to claim 2, wherein:

the tool holder and the inner sleeve each have at least one associated cutout in which the at least one locking element is arranged.

4. The hand-held power tool according to claim 3, wherein:

the at least one associated cutout of the inner sleeve is at least approximately U-shaped with an open end; and the open end is arranged facing the spring-loaded pressure ring.

5. The hand-held power tool according to claim 2, wherein:

an inner circumference of the outer sleeve has at least one radially inwardly directed extension; and an outer circumference of the stop sleeve has at least one first receptacle associated with the at least one radially inwardly directed extension so as to form a rotation lock for the locking sleeve.

6. The hand-held power tool according to claim 1, wherein:

the locking sleeve forms an inner receptacle in which the spring-loaded pressure ring is arranged.

7. The hand-held power tool according to claim 1, wherein:

the spring-loaded pressure ring has an end face facing the at least one locking element; and the end face includes at least one receptacle configured to form one of linear and surface contact with the at least one locking element in the locking position.

8. The hand-held power tool according to claim 1, wherein:

the locking sleeve includes a plastic material: and the spring-loaded pressure ring includes a metal material.

9. The hand-held power tool according to claim 1, wherein:

the hand-held power tool is one of a hammer drill and a chipping hammer; and the tubular tool holder is a hammer tube.

10. The hand-held power tool according to claim 1, wherein the contact surface includes a circle segment that defines the angled portion.

11. A hand-held power tool, comprising:

a tool receptacle comprising:

a tubular tool holder configured to receive an application tool; and a locking device configured to lock the application tool in the tubular tool holder, the locking device comprising:

at least one locking element arranged in the tubular tool holder and configured to lock the application tool in a locking position;

a locking sleeve;

a spring element;

a pressure ring that is spring loaded via the spring element so as to force the locking sleeve into the locking position and, in the locking position, force the at least one locking element against the tubular tool holder; and a stop sleeve having a contact surface on an inner circumference of the stop sleeve, wherein:

in the locking position, the at least one locking element is forced against the contact surface by the pressure ring;

the locking sleeve has, at an axial end, a radially outer sleeve and a radially inner sleeve which are arranged coaxially with one another;

the outer and inner sleeves are formed in one piece with the locking sleeve; and a receptacle in which the stop sleeve engages is formed between the outer and inner sleeves.

* * * * *